(12) United States Patent
Muramatsu et al.

(10) Patent No.: US 11,603,035 B2
(45) Date of Patent: Mar. 14, 2023

(54) VEHICLE HEADLIGHT SYSTEM, CONTROL METHOD OF VEHICLE HEADLIGHT SYSTEM

(71) Applicants: STANLEY ELECTRIC CO., LTD., Tokyo (JP); HONDA MOTOR CO., LTD., Tokyo (JP)

(72) Inventors: Naoki Muramatsu, Tokyo (JP); Ryuichi Nakano, Tokyo (JP)

(73) Assignees: STANLEY ELECTRIC CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/482,625

(22) Filed: Sep. 23, 2021

(65) Prior Publication Data
US 2022/0089083 A1 Mar. 24, 2022

(30) Foreign Application Priority Data

Sep. 23, 2020 (JP) .............................. JP2020-158339

(51) Int. Cl.
*B60Q 1/14* (2006.01)
*B60T 7/12* (2006.01)

(52) U.S. Cl.
CPC .............. *B60Q 1/143* (2013.01); *B60T 7/12* (2013.01); *B60Q 2300/41* (2013.01); *B60Q 2300/45* (2013.01); *B60T 2210/32* (2013.01); *B60T 2260/00* (2013.01)

(58) Field of Classification Search
CPC ........................ B60Q 1/143; B60Q 2300/40; B60Q 2300/41; B60Q 2300/42; B60Q 2300/43; B60Q 2300/45; B60Q 2300/47
See application file for complete search history.

(56) References Cited

U.S. PATENT DOCUMENTS

2020/0010079 A1* 1/2020 Ito ........................ B60Q 1/1423

FOREIGN PATENT DOCUMENTS

JP 2018-154313 A 10/2018

* cited by examiner

*Primary Examiner* — Robert J May
(74) *Attorney, Agent, or Firm* — Kenealy Vaidya LLP (57) ABSTRACT

To suitably irradiate with a high beam according to a situation in front of the own vehicle. A vehicle headlight system installed in an own vehicle provided with an automatic brake controller which automatically activates a brake system depending on a situation, including: a lamp unit which irradiates at least with a low beam and a high beam; and a controller which is connected to the automatic brake controller and the lamp unit and is configured to control the operation of the lamp unit; where, when the lamp unit is not performing irradiation of the high beam, the controller is configured to control the lamp unit to irradiate with the high beam in the situation in which state of the automatic brake controller transitions from a standby state to a state which activates the brake system to a hard braking or to a preparation state thereof.

7 Claims, 6 Drawing Sheets

VEHICLE HEADLIGHT SYSTEM, CONTROL METHOD OF VEHICLE HEADLIGHT SYSTEM

BACKGROUND

Technical Field

The present disclosure relates to a vehicle headlight system.

Description of the Background Art

Japanese Unexamined Patent Application Publication No. 2018-154313 (hereinafter referred to as Patent Document 1) discloses a driving support device which performs control to suppress switching from a high beam to a low beam of an irradiated light of a vehicle when the irradiated light is preset to the high beam and in a case where control is performed in order to avoid a collision between an object and the vehicle (for example, automatic brake control).

However, Patent Document 1 does not particularly describe control of the irradiated light when it is not preset to the high beam.

In a specific aspect, it is an object of the present disclosure to provide a technique to suitably irradiate with a high beam according to the situation in front of the vehicle.

SUMMARY

[1] A vehicle headlight system according to one aspect of the present disclosure is a vehicle headlight system installed in an own vehicle provided with an automatic brake controller which automatically activates a brake system depending on a situation, including: (a) a lamp unit which irradiates at least with a low beam and a high beam; and (b) a controller which is connected to the automatic brake controller and the lamp unit and is configured to control the operation of the lamp unit; (c) where, when the lamp unit is not performing irradiation of the high beam, the controller is configured to control the lamp unit to irradiate with the high beam in the situation in which state of the automatic brake controller transitions from a standby state to a state which activates the brake system to a hard braking or to a preparation state thereof.

[2] A vehicle headlight system according to one aspect of the present disclosure is a control method of a vehicle headlight system in which the vehicle headlight system is installed in an own vehicle provided with an automatic brake controller which automatically activates a brake system depending on a situation, (a) where the vehicle headlight system comprises a lamp unit which irradiates at least with a low beam and a high beam, and (b) where, when the lamp unit is not performing irradiation of the high beam, in the situation in which state of the automatic brake controller transitions from a standby state to a state which activates the brake system to a hard braking or to a preparation state thereof, the lamp unit is controlled to irradiate with the high beam.

According to the above configurations, a high beam can be suitably irradiated according to the situation in front of the own vehicle.

DESCRIPTION OF THE PREFERRED EMBODIMENTS

Figure 1:
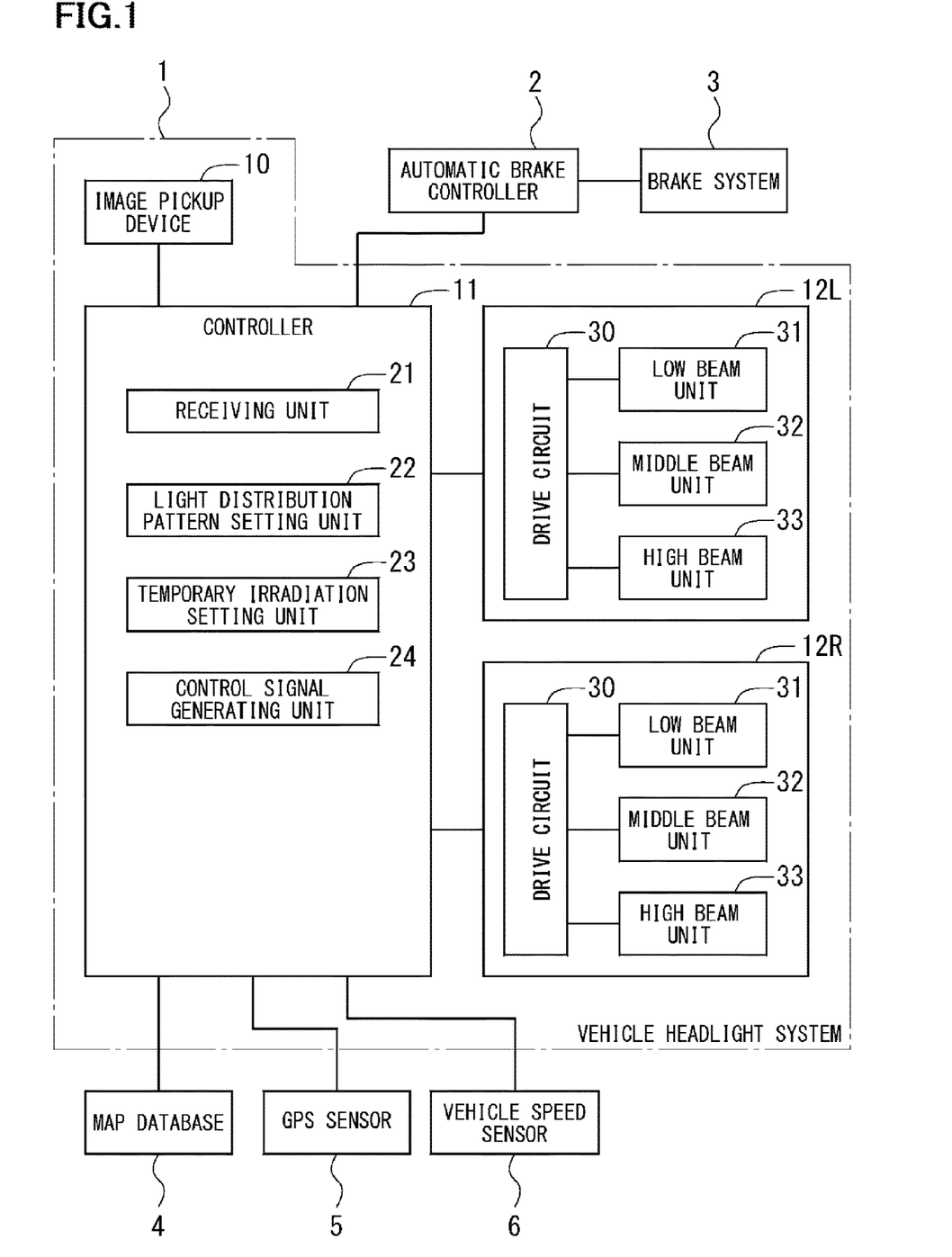
FIG. 1 is a block diagram showing a configuration of a vehicle headlight system according to an embodiment.

FIG. 1 is a block diagram showing a configuration of a vehicle headlight system according to an embodiment. The illustrated vehicle headlight system 1 is configured to include an image pickup device 10, a controller 11, and a pair of lamp units (vehicle lamps) 12L and 12R. The vehicle headlight system 1 is connected to each of an automatic brake controller 2, a map database 4, a GPS sensor 5, and a vehicle speed sensor 6.

The automatic brake controller 2 automatically activates a brake system 3 of the vehicle according to the situation of an object (a pedestrian, a building, etc.) surrounding the vehicle. The automatic brake controller 2 can be realized by a publicly known art and is provided with an object detecting function based on an image taken by a camera or an object detecting function realized by a radar device or the like. According to the situation such as type of the object and relative distance from the object to the vehicle which are detected by these devices, the automatic brake controller 2 automatically activates the brake system 3 to brake the vehicle.

The vehicle headlight system 1 of the present embodiment is connected to the above-described automatic brake controller 2, and obtains brake information which indicates the operating status of the automatic brake controller 2 from the automatic brake controller 2. And the vehicle headlight system 1 controls the operation of the pair of lamp units 12L and 12R by using the brake information and various information obtained from the image pickup device 10.

The map database 4 stores map data of each geographical point in Japan, for example. The map data referred to here are data which include the positions of roads and their type (highway, national road, prefectural road, etc.), traffic regulations (speed limit, one-way street, etc.), regional attributes of each geographical point (urban area, non-urban area, etc.) and the like, and are configured so that the data can be referred to based on the current position of the vehicle obtained by the GPS sensor 5. The GPS sensor 5 detects the current position of the vehicle. The vehicle speed sensor 6 detects the speed (vehicle speed) of the vehicle.

The image pickup device 10 is provided with a camera (image pickup element) and an image processing unit. The camera is installed at a predetermined position of the own vehicle (for example, the upper part of the windshield inside the vehicle), and captures images of the front of the own vehicle. The image processing unit detects an object existing in front of the own vehicle by performing predetermined image processing of the images (footage) captured by the camera. The "object" here refers to, for example, other vehicle such as an oncoming vehicle and a preceding vehicle (hereinafter referred to as a "forward vehicle"), pedestrians, cyclists, obstacles such as buildings, road markings on the road surface such as white lines. In this embodiment, the image pickup device 10 corresponds to a "vehicle detector".

Here, if the vehicle is equipped with a device equivalent to the image pickup device 10 which is intended for other uses (for example, steering assist function, automatic brake function, etc.), by using the output of the device, the device can replace the image pickup device 10 used for the headlight system 1.

The controller 11 is realized by using a computer system having a CPU (Central Processing Unit), a ROM (Read Only Memory), a RAM (Random Access Memory), and the like, and executing a predetermined operation program in the computer system. The controller 11 has a receiving unit 21, a light distribution pattern setting unit 22, a temporary irradiation setting unit 23, and a control signal generating unit 24, as functional blocks.

The receiving unit 21 receives brake information from the automatic brake controller 2. The brake information referred to here is a signal or data indicating the status of the brake system 3 controlled by the automatic brake controller 2, and the details thereof will be described later. Further, the receiving unit 21 receives detection result of the object existing in front of the own vehicle from the image pickup device 10. The receiving unit 21 of the present embodiment receives from the image pickup device 10 at least forward vehicle information which is a signal or data indicating information regarding the position and size of a forward vehicle and object detection information which is a signal or data indicating information regarding the position and size of an object such as a pedestrian. Here, signals or data indicating information such as type of the forward vehicle and type of the object may further be received.

The light distribution pattern setting unit 22 sets a light distribution pattern according to the position and size of the forward vehicle detected by the image pickup device 10. The light distribution pattern includes a light irradiation region and a dimming region. For example, a certain area which is set corresponding to the position where the forward vehicle exists is set as a dimming region, and the area corresponding to the position where the forward vehicle does not exist is set as a light irradiation region. Here, "dimming" of "a dimming region" may be interpreted as either when the light intensity is 0 or when the light intensity is larger than 0 but relatively smaller than the light intensity of the light irradiation region.

Here, the light distribution pattern setting unit 22 of the present embodiment sets the entire region of the light distribution pattern to the dimming region when the vehicle speed of the vehicle detected by the vehicle speed sensor 6 is less than or equal to a predetermined reference speed (for example, 50 km/h), or when the current position of the vehicle which is obtained by referring to the map database 4 based on the detection result of the GPS sensor 5 corresponds to an urban area. That is, the light distribution pattern is set in order not to irradiate with the high beam.

The temporary irradiation setting unit 23 determines whether or not it is necessary to temporarily irradiate with the high beam by the high beam unit 33 based on the brake information, the forward vehicle information, and the object detection information received by the receiving unit 21, and when the unit determines that it is necessity to temporarily irradiate with the high beam, it transmits the determination result to that effect to the light distribution pattern setting unit 22. Further, when the temporary irradiation setting unit 23 determines that it is not necessary to temporarily irradiate with the high beam, the unit transmits the determination result to that effect to the light distribution pattern setting unit 22. When it is determined that temporary irradiation is necessary, the light distribution pattern setting unit 22 sets the entire high beam irradiation region to the light irradiation region, for example. When it is determined that temporary irradiation is not necessary, the light distribution pattern setting unit 22 sets the entire high beam irradiation region to the dimming region, for example.

The control signal generating unit 24 generates a control signal (light distribution control signal) for turning on and off the lamp units 12L and 12R, and outputs the control signal to the lamp units 12L and 12R. Specifically, the control signal generating unit 24 generates a control signal for operating the high beam unit 33 according to the light distribution pattern set by the light distribution pattern setting unit 22. Further, the control signal generating unit 24 generates control signals for operating each of the low beam unit 31 and the middle beam unit 32.

The lamp units 12R and 12L are mounted on the left and right sides of the front portion of the own vehicle respectively to irradiate the front of the vehicle with light. These lamp units 12R and 12L each have a drive circuit 30, a low beam unit 31, a middle beam unit 32, and a high beam unit 33.

The drive circuit 30 drives the low beam unit 31, the middle beam unit 32, and the high beam unit 33 based on a control signal provided from the control signal generation unit 24 of the controller 11.

The low beam unit 31 includes, for example, a halogen lamp, a high-pressure mercury lamp, a metal halide lamp, a high-pressure sodium lamp, or a lamp using a semiconductor light emitting element such as an LED, and receives drive power from the drive circuit 30 to form a low beam. The low beam referred to here is a passing beam, which is a light beam for irradiating a relatively short distance in front of the vehicle.

The middle beam unit 32 is configured to include, for example, a plurality of light emitting elements (LEDs) arranged in a matrix and a lens which collects and projects light emitted from these light emitting elements and receives drive power from the drive circuit 30 to form a middle beam. The middle beam referred to here is a light beam having an irradiation region whose height is intermediate between the conventional high beam and low beam, and is suited to easily visualize pedestrians, cyclists, obstacles, etc. existing on the side of a road, a roadside zone, or the like.

The high beam unit 33 is configured to include, for example, a plurality of light emitting elements (LEDs) arranged in a matrix and a lens which collects and projects light emitted from these light emitting elements and receives drive power from the drive circuit 30 to form a high beam. The high beam referred to here is a driving beam, which is a light beam for irradiating a relatively long distance in front of the vehicle. Each light emitting element in the high beam unit 33 of the present embodiment can be individually turned on and off, and can selectively provide a dimming region in correspondence with a part of the high beam irradiation region by suitably turning on and off each light emitting element.

Figure 2:
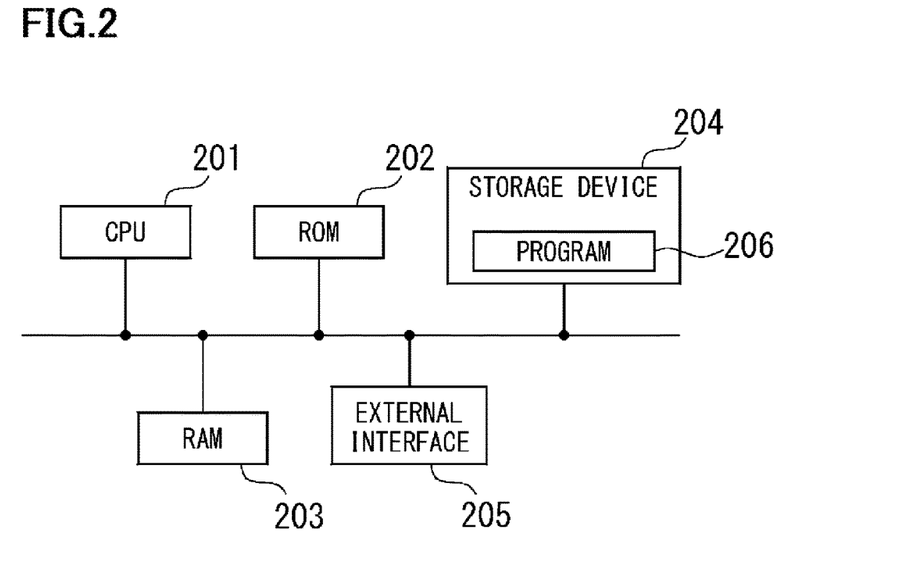
FIG. 2 is a diagram showing a configuration example of a computer system which realizes the controller.

FIG. 2 is a diagram showing a configuration example of a computer system that realizes the controller. The illustrated computer system is configured to include a CPU 201, a ROM 202, a RAM 203, a storage device 204, and an external interface 205 communicably connected to each other. The CPU 201 operates based on a basic control program read from the ROM 202, reads a program (an application program) 206 stored in the storage device 204, and executes the program. As a result, the function of the controller 11 described above is realized. The RAM 203 temporarily stores data to be used during the operation of the CPU 201. The storage device 204 is a non-volatile data storage device such as a hard disk or SSD (Solid State Drive), and stores various data such as the program 206. The external interface 205 is an interface for connecting the CPU 201 and an external device. In this embodiment, the external interface is used for connecting the automatic brake controller 2 and the image pickup device 10 to the CPU 201.

Figure 3:
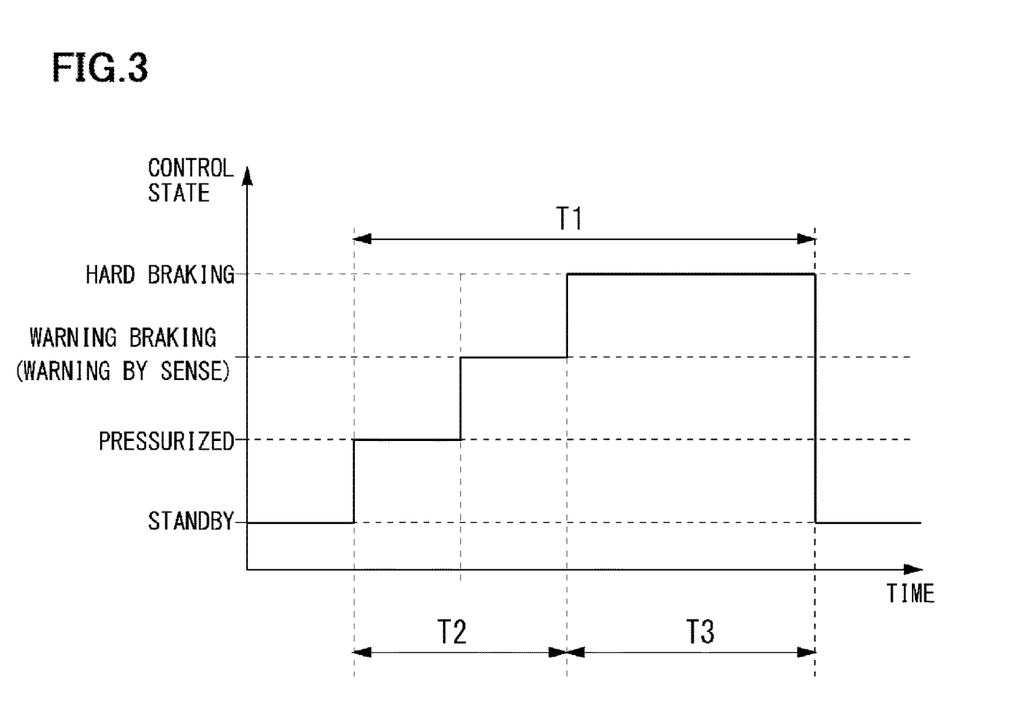
FIG. 3 is a diagram showing a timing chart when the brake system is controlled by the automatic brake controller.

FIG. 3 is a diagram showing a timing chart when the brake system is controlled by the automatic brake controller. In FIG. 3, control modes of the automatic brake is shown, with the lateral axis representing time, and the longitudinal axis representing the control state. The automatic brake controller 2 acquires information such as the type of object to be detected and relative distance to the vehicle and controls the brake system to maintain a state of control standby (hereinafter referred to as a "standby state") during a steady state which is a state until the conditions for automatically operating the brake system 3 are met. And then, when the conditions are met, the automatic brake controller 2 controls the brake system 3 to a state of pressurization (preliminary braking) (hereinafter referred to as a "pressurized state"). Next, the automatic brake controller 2 controls the brake system 3 to a state of warning braking (hereinafter referred to as "warning braking state"). This warning braking is for generating a braking force lower than that of a hard braking so that the driver can sense that the automatic brake is in operation (warning by sensing). Then, the automatic brake controller 2 controls the brake system 3 to a state of hard braking (hereinafter referred to as a "hard braking state"). This hard braking state is an operating state (a fully operating state) in which maximum braking force is generated. Here, in this embodiment, the pressurized state and the warning braking state correspond to a "preparation state".

As described above, since the automatic brake controller 2 of the present embodiment assumes four states which are the standby state, the pressurized state, the warning braking state, and the hard braking state, the receiving unit 21 of the vehicle headlight system 1 acquires brake information which indicates one of these four states from the automatic brake controller 2. As shown in the figure, period T1 is defined as the period from the time in which transition takes place from the standby state to the pressurized state, the period further including transition to the warning braking state and the hard braking state, until the time in which the hard braking state is released to return to the standby state. Of this period T1, period T2 is defined as the period which combines the periods of the pressurized state and the warning braking state (the period of the preparation state), and period T3 is defined as the period of the hard braking state. For example, the length of the period T2 is about 40 ms when the vehicle speed just prior to pressurization is 30 km/h. This amount of time is sufficient for the temporary irradiation setting unit 23 of the controller of the present embodiment to determine the necessity of temporary irradiation. Further, the hard braking state during the period T3 is released when the speed of the vehicle relative to the object becomes relatively low (for example, 20 km/h or less), or when the brake pedal or the accelerator pedal of the vehicle is pressed by the driver (override), or in a situation where the object is not detected (sensing omission).

Figure 4A:
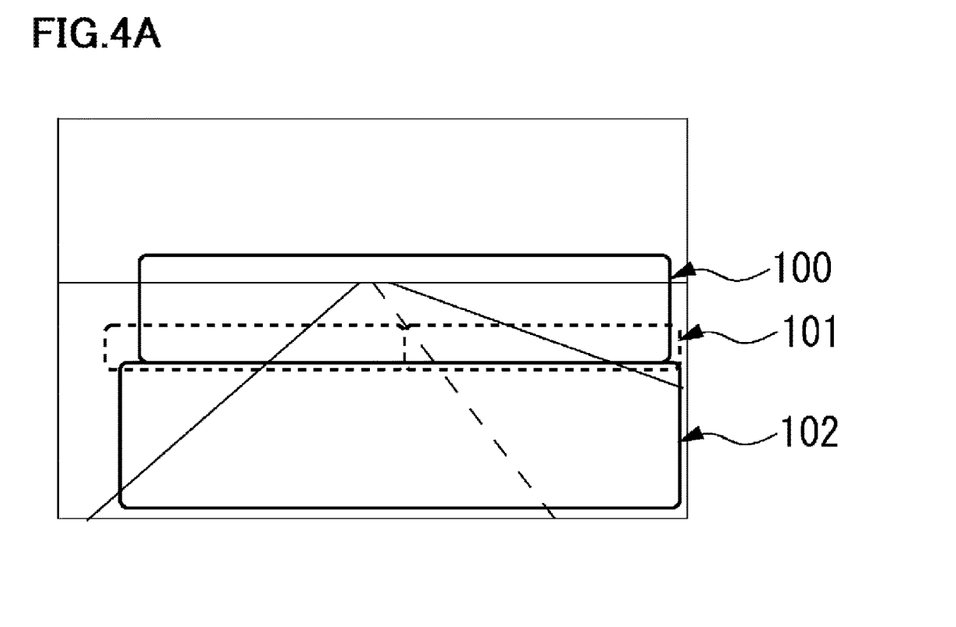
FIG. 4A is a diagram for explaining a low beam, a middle beam, and a high beam formed by the lamp unit.

FIG. 4A is a diagram for explaining a low beam, a middle beam, and a high beam formed by the lamp unit. In this FIG. 4A, on a virtual screen at a predetermined position in front of the own vehicle (for example, a position 25 meters in front), the shape and arrangement of each beam is schematically shown. As shown, the high beam 100 partially overlaps the middle beam 101. In the present embodiment, the lower ends of the high beam 100 and the middle beam 101 are substantially at the same position, and with regard to the upper ends, the high beam 100 is at a relatively upper position. The high beam 100 is irradiated onto the same region as the conventional high beam also known as a driving beam, and is for irradiating a relatively long distance in front of the own vehicle.

Whereas, the middle beam 101 is formed at a position lower than the conventional high beam and higher than the conventional low beam 102 also known as a passing beam. In the present embodiment, the middle beam 101 is formed at a height intermediate between the conventional high beam and the low beam, and is formed wider than the high beam 100. The middle beam 101 is suited to easily visualize pedestrians, cyclists, obstacles, etc. existing on the side of a road or at a roadside zone, etc.

Further, the low beam 102 is a light beam (a passing beam) which irradiates a relatively short distance in front of the vehicle as described above, and is formed at a position relatively lower than the middle beam 101 and the high beam 100. In the present embodiment, the low beam 102 is set so that the lower end of its irradiation region is lower than those of the middle beam 101 and the high beam 100, and the upper end side of its irradiation region is set so as to slightly overlap the lower ends of the irradiation region of the middle beam 101 and the high beam 100.

Figure 4B:
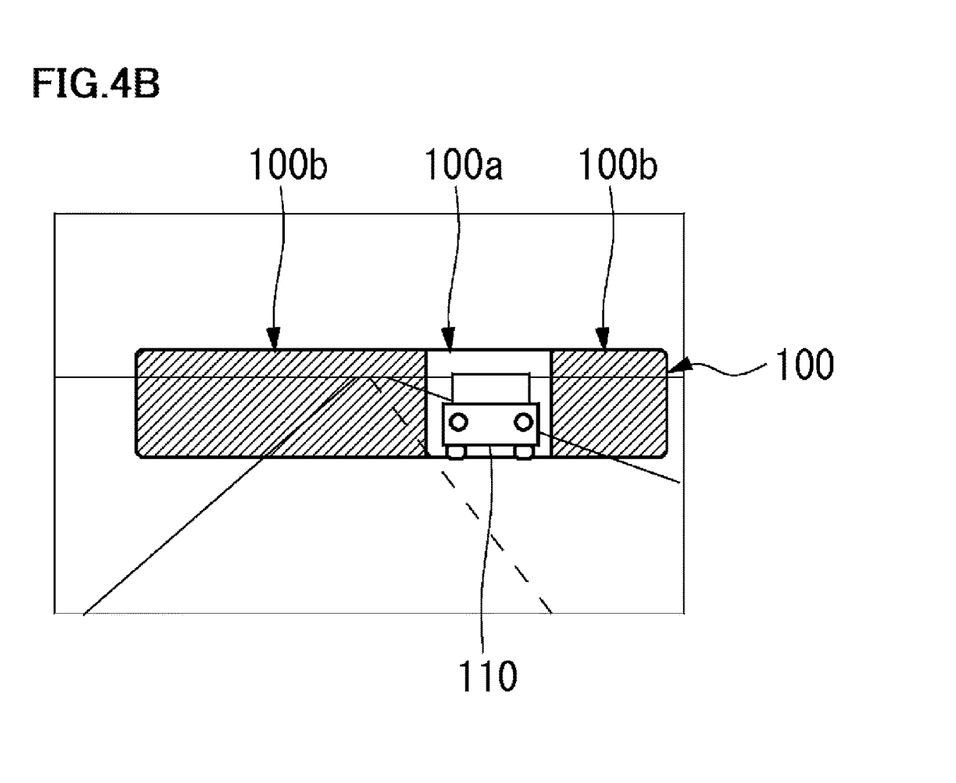
FIG. 4B is a diagram for explaining a light distribution pattern.

FIG. 4B is a diagram for explaining a light distribution pattern. Similar to FIG. 4A, an example of a high beam on a virtual screen at a predetermined position in front of the own vehicle (for example, a position 25 meters ahead) is schematically shown. Here, for clarity of explanation, the high beam is shown while the low beam and the middle beam are being omitted. As shown in the illustrated example, when the forward vehicle 110 (oncoming vehicle in this example) exists, a dimming region 100a is set according to the position and size of the forward vehicle 110, and the high beam 100 is formed in the remaining region which is set as the light irradiation region 100b, and is irradiated to the front of the own vehicle.

Figure 5A:
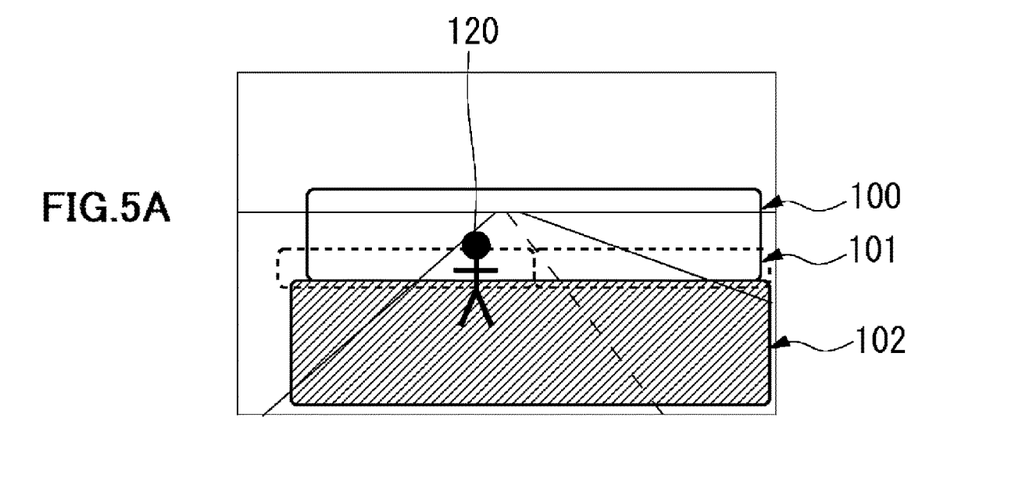
FIG. 5A to FIG. 5C are diagrams schematically showing aspects in which a high beam is temporarily irradiated by the vehicle headlight system.
Figure 5B:
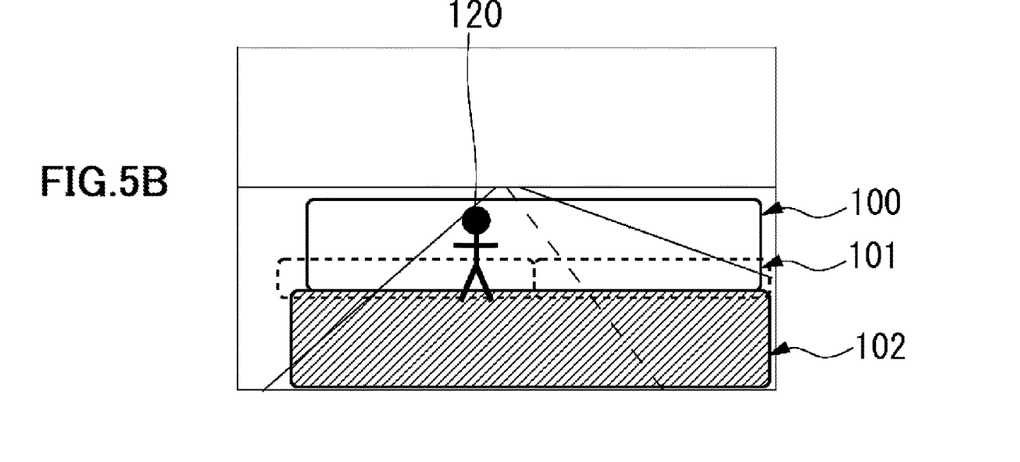
Figure 5C:
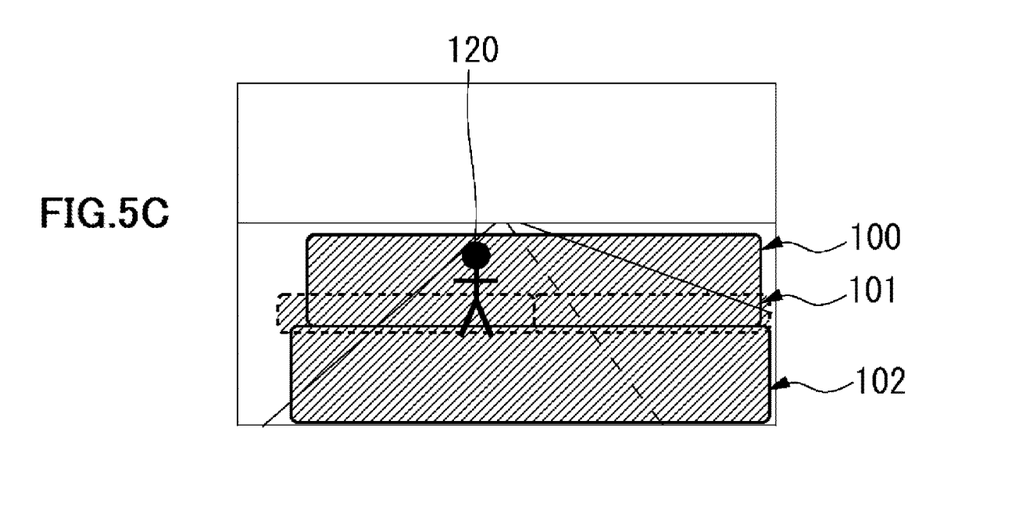

FIG. 5A to FIG. 5C are diagrams schematically showing aspects in which a high beam is temporarily irradiated by the vehicle headlight system. As shown in FIG. 5A, assuming that a pedestrian 120 as an example of an object is present in front of the vehicle, the automatic brake controller 2 transitions from the standby state to the pressurized state, then to the warning braking state, and then to the hard braking state. At this moment, since the front part of the vehicle dips (nose dive) due to hard braking, as shown in FIG. 5B, the direction of the low beam 102 becomes relatively downward and the irradiation region narrows toward the side closer to the vehicle. Here, as shown in FIG. 5B, if the high beam 100 and the middle beam 101 are not pre-irradiated, the pedestrian 120 may be hardly irradiated with light. As a result, the driver may encounter a situation where it is difficult to clearly visualize the pedestrian 120. In such a situation, as shown in FIG. 5C, the vehicle headlight system 1 at least temporarily irradiates with the high beam 100. Further, the middle beam 101 may also be irradiated. Temporary irradiation of the high beam 100, etc. is preferably initiated during the above-described period T2 (period of preparation state), but may be initiated after the start of the period T3, and the irradiation is continued until the end of the period T3, and the irradiation is stopped when the automatic brake is released. By such control, the driver can clearly visualize the object such as the pedestrian 120 while nose dive is occurring.

Figure 6:
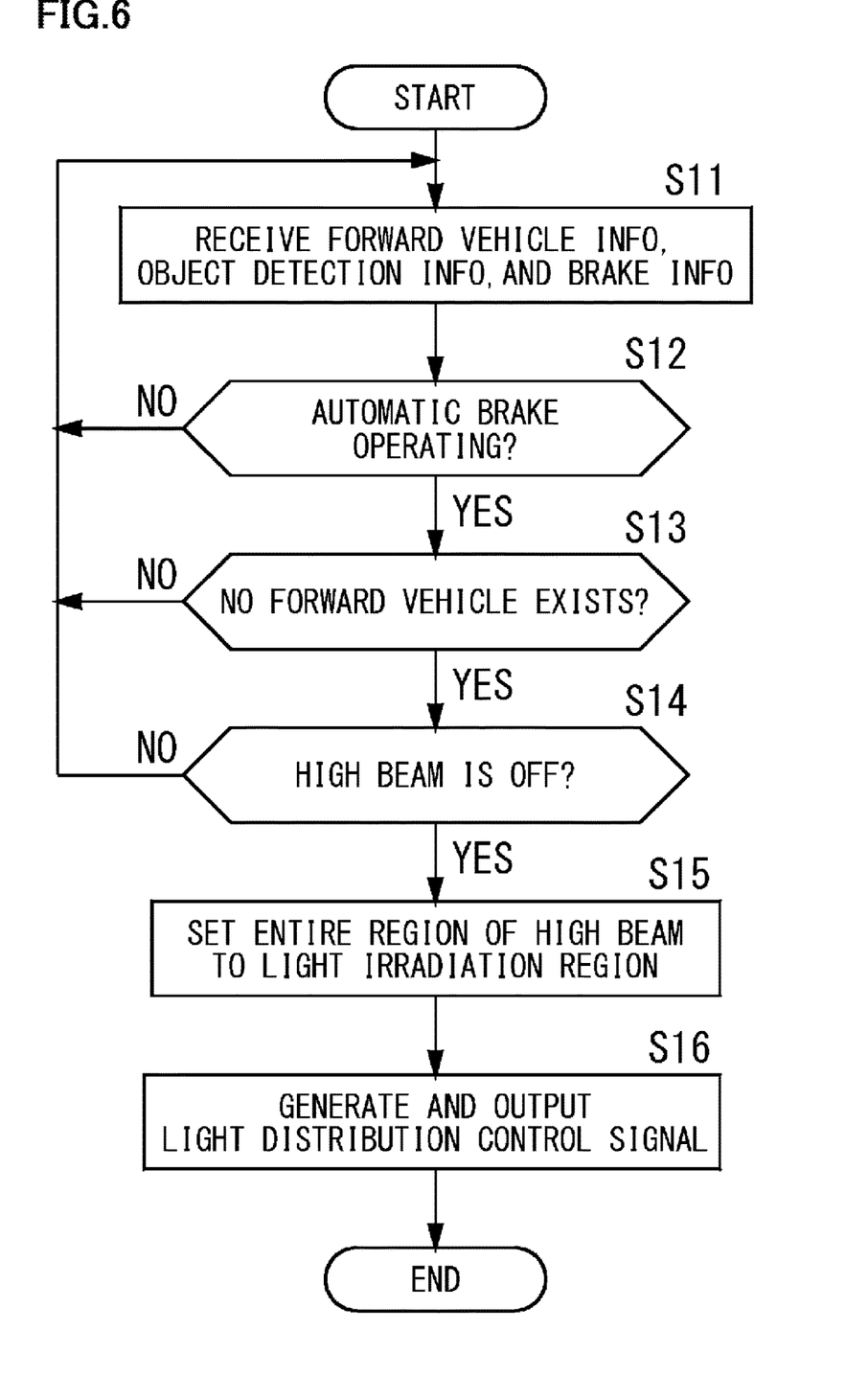
FIG. 6 is a flowchart showing a processing procedure when the vehicle headlight system performs temporary irradiation of a high beam.

FIG. 6 is a flowchart showing a processing procedure when the vehicle headlight system performs temporary irradiation of a high beam. Here, it should be noted that each of the illustrated processes can be executed by changing the order of each other as long as the result does not cause contradiction or inconsistency, and such an embodiment is not excluded. Further, it is premised that the lamp units 12R and 12L are operated according to the lighting operation of the light switch of the vehicle and the control for selective irradiation of the high beam is executed as well. Further, as described above, it is premised that the high beam is controlled so that it is not irradiated (or set to the dimming region) when the vehicle speed is below a predetermined reference speed (for example, 50 km/h) or when the current position of the vehicle corresponds to an urban area.

When each of forward vehicle information, object detection information, and brake information is received by the receiving unit 21 (step S11), based on the brake information, the temporary irradiation setting unit 23 determines whether or not the brake system 3 which is controlled by the automatic brake controller 2 is operating (whether or not the automatic brake is operating) (step S12). In the present embodiment, if the control state of the automatic brake controller 2 is other than the "standby state", it is determined that the automatic brake is operating.

When the automatic brake is in operation (step S12; YES), the temporary irradiation setting unit 23 determines whether or not there exists no forward vehicle based on the forward vehicle information (step S13).

When there exists no forward vehicle (step S13; YES), the temporary irradiation setting unit 23 determines whether or not the high beam is off based on the light distribution pattern set by the light distribution pattern setting unit 22 (Step S14). The term "high beam is off" as used herein means that the entire region of the light distribution pattern is set to the dimming region, and this state occurs when the above-described predetermined condition (for example, the current vehicle position being in an urban area) is satisfied. Further, in the present embodiment, even when the forward vehicle information indicates that a forward vehicle exists, if the position of the forward vehicle is outside the high beam irradiation region, then it is determined that the forward vehicle does not exist.

When the high beam is off (step S14; YES), the temporary irradiation setting unit 23 provides to the light distribution pattern setting unit 22 a signal or data which indicates that the temporary irradiation of the high beam is required. In response to this, the light distribution pattern setting unit 22 sets the entire high beam region to the light irradiation region (step S15).

The control signal generating unit 24 generates a control signal (light distribution control signal) for turning on and off the lamp units 12L and 12R, and outputs the control signal to the lamp units 12L and 12R (step S16). As a result, temporary irradiation of the high beam is performed. Here, it is preferable that the control signal generating unit 24 generates a control signal so that the middle beam is also irradiated in accordance with the temporary irradiation of the high beam.

Here, if a negative determination is made in any of steps S12, S13, or S14, high beam is not temporarily irradiated, and the process returns to step S11. Thereby, even when automatic brake is in operation, if a forward vehicle is present, since high beam will not be irradiated, glare to the forward vehicle can be avoided, for example. Further, after temporary irradiation of the high beam is executed, the process proceeds to the release of temporary irradiation which will be described below.

Figure 7:
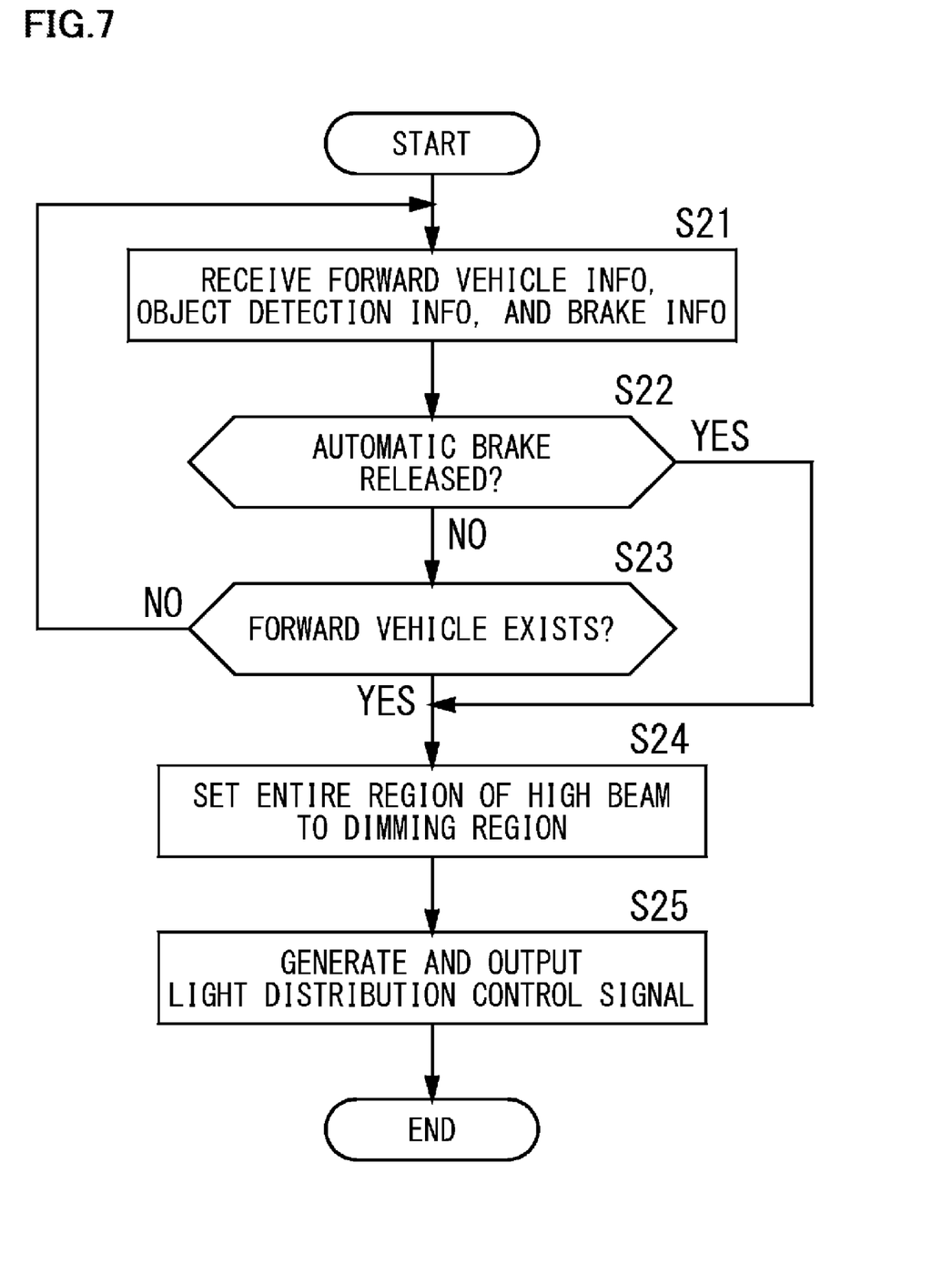
FIG. 7 is a flowchart showing a processing procedure when the vehicle headlight system releases temporary irradiation of a high beam.

FIG. 7 is a flowchart showing a processing procedure when the vehicle headlight system releases temporary irradiation of a high beam. Here, it should be noted that each of the illustrated processes can be executed by changing the order of each other as long as the result does not cause contradiction or inconsistency, and such an embodiment is not excluded.

When each of the forward vehicle information, the object detection information, and the brake information is received by the receiving unit 21 (step S21), based on the brake information, the temporary irradiation setting unit 23 determines whether or not the brake system 3 which is controlled by the automatic brake controller 2 is released (step S22). In the present embodiment, if the control state of the automatic brake controller 2 is in the "standby state", it is determined that the automatic brake is released.

When the automatic is not released (step S22; NO), then the temporary irradiation setting unit 23 determines whether or not a forward vehicle exists based on the forward vehicle information (step S23). If there is no forward vehicle (step S23; NO), then the process returns to step S21. That is, high beam irradiation is maintained.

When the automatic brake is released (step S22; YES), or if a new forward vehicle appears while the automatic brake is in operation and thereby there exists a forward vehicle (step S23; YES), the temporary irradiation setting unit 23 provides to the light distribution pattern setting unit 22 a signal or data which indicates that the temporary irradiation of the high beam is not required. Then, the light distribution pattern setting unit 22 sets the entire high beam region to the dimming region (step S24).

The control signal generating unit 24 generates a control signal (light distribution control signal) for turning on and off the lamp units 12L and 12R, and outputs the control signal to the lamp units 12L and 12R (step S25). As a result, temporary irradiation of the high beam is released. That is, the high beam irradiation is stopped or becomes a dimmed state. Here, it is preferable that the control signal generating unit 24 generates a control signal so that irradiation of the middle beam is also released in accordance with such release of temporary irradiation of the high beam.

According to the above-described embodiment, a high beam can be suitably irradiated according to the situation in front of the vehicle.

It should be noted that this disclosure is not limited to the subject matter of the foregoing embodiment, and can be implemented by being variously modified within the scope of the present disclosure as defined by the appended claims. For example, in the above-described embodiment, three types of beams, a low beam, a middle beam, and a high beam are used, but the middle beam is not essential and may be omitted. Further, in the above-described embodiment, brake information is acquired from the automatic brake controller 2 and the necessity for temporary irradiation of the high beam is determined based on the brake information, but the necessity may be determined by the controller 11 based on the information obtained from the image pickup device 10 and the vehicle speed and the like. For example, when information to the effect that an object such as a pedestrian exists is obtained from the image pickup device 10 and the relative distance therebetween is equal to or less than a predetermined reference, it can be determined that temporary irradiation of the high beam is required.

Further, in the above-described embodiment, an example using multiple light emitting elements is disclosed as a configuration example in order to selectively emit light from each part of the high beam unit, but the present disclosure is not limited thereto. For example, a lamp unit including a light source and a light modulator (such as a liquid crystal apparatus) having multiple shutter elements capable of transmitting and shielding light from each part of the light source may be used. Further, a lamp unit including a laser element, a controller which controls on/off of a laser light emission of the laser element, a scanner which scans the direction of the laser light and makes it incident into a fluorescent body, and the fluorescent body which generates fluorescence according to the laser light, may be used.

The present application is based on, and claims priority from, JP Application Serial Number, 2020-158339 filed on Sep. 23, 2020, the disclosure of which is hereby incorporated by reference herein in its entirety.

DESCRIPTION OF THE REFERENCE NUMERALS

1: Vehicle headlight system
2: Automatic brake controller
3: Brake system
4: Map database
5: GPS sensor
6: Vehicle speed sensor
10: Image pickup device
11: Controller
12L, 12R: Lamp unit
21: Receiving unit
22: Light distribution pattern setting unit
23: Temporary irradiation setting unit
24: Control signal generating unit
30: Drive circuit
31: Low beam unit
32: Middle beam unit
33: High beam unit

What is claimed is:

1. A vehicle headlight system installed in an own vehicle provided with an automatic brake controller which automatically activates a brake system depending on a situation, comprising:
   a lamp unit which irradiates at least with a low beam and a high beam; and
   a controller which is connected to the automatic brake controller and the lamp unit and is configured to control the operation of the lamp unit,
   wherein, when the lamp unit is not performing irradiation of the high beam, the controller is configured to control the lamp unit to irradiate with the high beam in the situation in which state of the automatic brake controller transitions from a standby state to a state which activates the brake system to a hard braking or to a preparation state thereof.

2. The vehicle headlight system according to claim 1 further comprising a vehicle detector which detects an other vehicle in front of the own vehicle,
   wherein the controller is configured to control the lamp unit to irradiate with the high beam when the other vehicle is not detected by the vehicle detector.

3. The vehicle headlight system according to claim 1,
   wherein the preparation state of the automatic brake controller includes a state in which the brake system is pressurized and a state in which the brake system is operated with a brake force lower than that of the hard braking, and
   wherein the controller is configured to control the lamp unit to irradiate with the high beam during the preparation state.

4. The vehicle headlight system according to claim 1,
   wherein, when state of the automatic brake controller returns to the standby state, the controller is configured to control the lamp unit so that the irradiation of the high beam is stopped or dimmed.

5. The vehicle headlight system according to claim 2,
   wherein, after the controller controls the lamp unit to irradiate with the high beam, when the other vehicle is detected by the vehicle detector, the controller is configured to control the lamp unit so that the irradiation of the high beam is stopped or dimmed.

6. The vehicle headlight system according to claim 2,
   wherein, when an object which does not include the other vehicle and includes at least a pedestrian exists in front of the own vehicle, state of the automatic brake controller transitions from the standby state to the state which activates the brake system to the hard braking or to the preparation state thereof.

7. A control method of a vehicle headlight system in which the vehicle headlight system is installed in an own vehicle provided with an automatic brake controller which automatically activates a brake system depending on a situation,
   wherein the vehicle headlight system comprises a lamp unit which irradiates at least with a low beam and a high beam, and
   wherein, when the lamp unit is not performing irradiation of the high beam, in the situation in which state of the automatic brake controller transitions from a standby state to a state which activates the brake system to a hard braking or to a preparation state thereof, the lamp unit is controlled to irradiate with the high beam.

* * * * *